(12) United States Patent
Albero et al.

(10) Patent No.: US 12,423,698 B2
(45) Date of Patent: Sep. 23, 2025

(54) SECURE USER AUTHENTICATION BASED ON DYNAMICALLY GENERATED USER PROMPTS

(71) Applicant: Bank of America Corporation, Charlotte, NC (US)

(72) Inventors: George Albero, Charlotte, NC (US); Amit Pandey, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 311 days.

(21) Appl. No.: 17/866,921

(22) Filed: Jul. 18, 2022

(65) Prior Publication Data

US 2024/0020697 A1  Jan. 18, 2024

(51) Int. Cl.
*G06F 21/31* (2013.01)
*G06Q 20/38* (2012.01)
*G06Q 20/40* (2012.01)

(52) U.S. Cl.
CPC ......... *G06Q 20/4014* (2013.01); *G06F 21/31* (2013.01); *G06Q 20/388* (2013.01); *G06F 2221/2103* (2013.01)

(58) Field of Classification Search
CPC ............ G06F 21/31; G06F 2221/2103; G06Q 20/4014; G06Q 20/388
See application file for complete search history.

(56) References Cited

U.S. PATENT DOCUMENTS

| | | | |
|---|---|---|---|
| 8,495,718 B2 | 7/2013 | Han et al. | |
| 8,646,060 B1 * | 2/2014 | Ben Ayed | H04W 4/20 726/9 |
| 8,745,698 B1 | 6/2014 | Ashfield et al. | |
| 8,793,777 B2 * | 7/2014 | Colson | H04L 63/0428 713/168 |
| 8,925,053 B1 | 12/2014 | Mehta | |

(Continued)

FOREIGN PATENT DOCUMENTS

| | | | | |
|---|---|---|---|---|
| CA | 2664510 A1 | 4/2008 | | |
| CN | 105143996 A | * | 12/2015 | ......... G06Q 20/3829 |

OTHER PUBLICATIONS

Zheng, Wei-Long, Vigilance Estimation Using a Wearable EOG Device in Real Driving Environment, EEE transactions on intelligent transportation systems, Jan. 2020, vol. 21 (1), p. 170-184.*

*Primary Examiner* — Ilse I Immanuel

(74) *Attorney, Agent, or Firm* — Banner & Witcoff, Ltd.

(57) ABSTRACT

Arrangements for providing dynamic user authentication are provided. In some aspects, a user may initiate a transaction at a merchant point-of-sale (POS) system, via a merchant website, or the like. In response, user data from one or more pre-registered user devices may be retrieved. The data may be analyzed to identify one or more data points for use as a correct answer to an authentication question. An authentication question may be dynamically generated and transmitted to the merchant system for display and the user may provide authentication response data. The authentication response data may be received and compared to the data points providing the basis for the authentication question. If the data matches, the user may be authenticated and the transaction may be processed. If not, additional user authentication data may be requested. The system may then delete the received user data.

15 Claims, 12 Drawing Sheets

(56) References Cited

U.S. PATENT DOCUMENTS

| | | |
|---|---|---|
| 11,068,891 B2 | 7/2021 | Ghosh et al. |
| 11,107,069 B2* | 8/2021 | Hammad ............... G06Q 20/20 |
| 2020/0265379 A1* | 8/2020 | Walker ............... G06Q 10/0833 |
| 2021/0334416 A1* | 10/2021 | Jung ....................... G06F 21/78 |

* cited by examiner

400

Welcome, Name!

Please Answer The Following Question:

What Time Were You At Location X Yesterday?

[ 402 ]

[ CANCEL ]                    [ OK ]

Welcome, Name!

Please Answer The Following Question:

From Which Merchant Did You Make A Purchase Earlier Today?

[ Merchant 1 ]          [ Merchant 2 ]

[ Merchant 3 ]          [ Merchant 4 ]

[ CANCEL ]                    [ OK ]

FIG. 5

SECURE USER AUTHENTICATION BASED ON DYNAMICALLY GENERATED USER PROMPTS

BACKGROUND

Aspects of the disclosure relate to electrical computers, systems, and devices for providing dynamic authentication.

Authentication systems and processes often rely on static questions that may be repeated for multiple customers and that may have static answers. The static nature of these questions and answers may make them vulnerable to detection by unauthorized actors. Accordingly, it would be advantageous to provide dynamically generated authentication questions that are customized to a user based on recent activity of the user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with secure user authentication.

In some aspects, a request to process a transaction may be received. For instance, a user may initiate a transaction at a merchant point-of-sale (POS) system, via a merchant website, or the like. In response, user or device data from one or more pre-registered user devices may be retrieved. The data may be analyzed to identify one or more data points or metrics for user as a correct or acceptable answer to an authentication question. Accordingly, an authentication question may be dynamically generated and transmitted to the merchant system for display. The display may include a user interface prompting the user to provide authentication response data.

The authentication response data may be received and compared to the data points or metrics providing the basis for the dynamically generated authentication question. If the data matches, the user may be authenticated and the transaction may be processed. If not, the transaction may be denied and/or additional user authentication data may be requested.

The system may then delete the received user or device data to avoid long-term storage of any user data.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4 and 5 illustrate example user interfaces including dynamically generated authentication questions that may be generated in accordance with one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, the use of static challenge questions to authenticate a user may leave a user vulnerable to unauthorized activity. Accordingly, aspects described herein relate to receiving, in real-time, recently captured user or device data, such as location data, movement data, purchase data, or the like, with the permission of the user, to identify data points that may provide a basis for one or more dynamically generated authentication questions.

Accordingly, one or more authentication questions may be generated based on the identified data points and transmitted for display. In response, the user may provide authentication response data that may be compared to the data points. If a match exists, the user may be authenticated and the transaction may be processed. If a match does not exist, the transaction may be denied and/or additional authentication data may be requested. The user data may then be deleted to avoid any long-term storage of the data.

These and various other arrangements will be discussed more fully below.

Figure 1A:
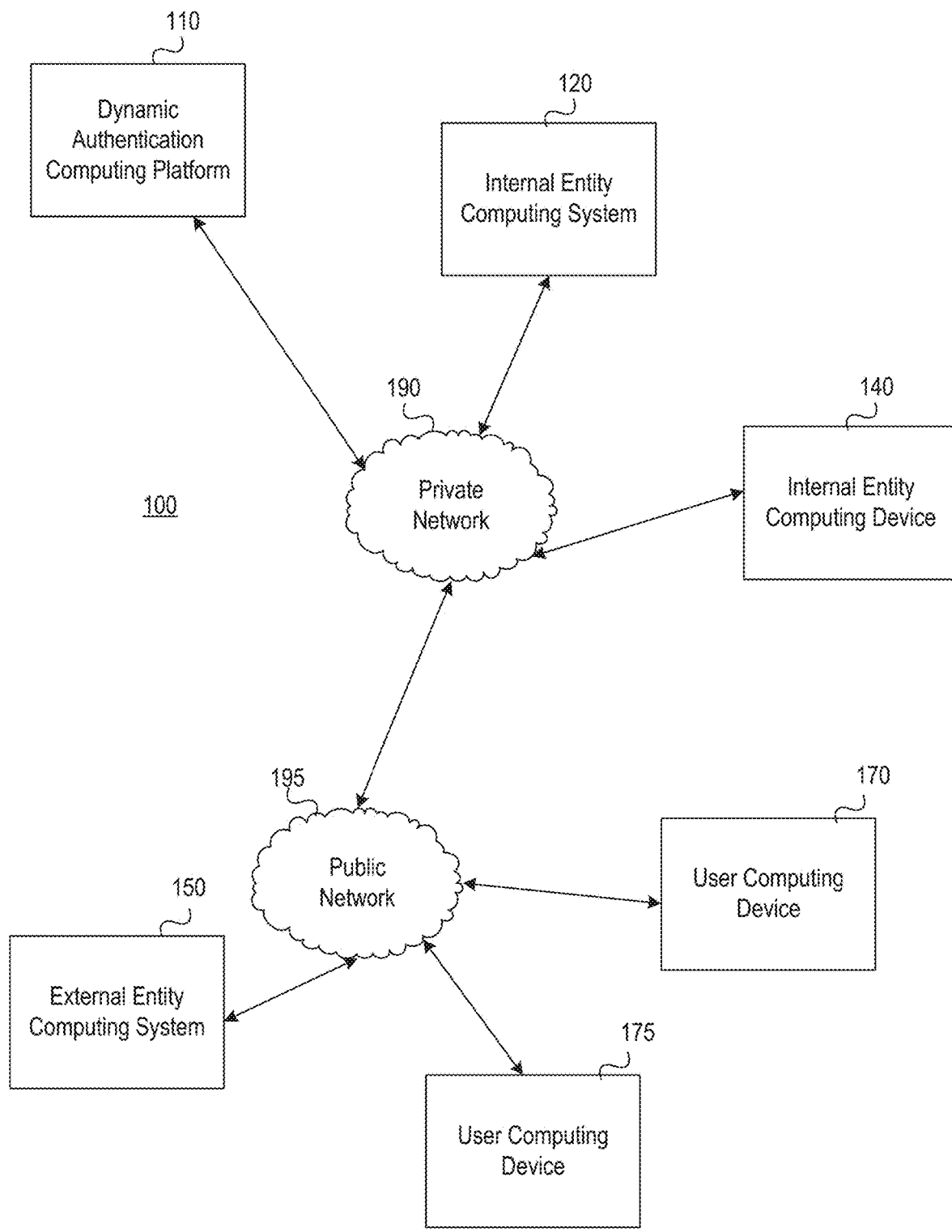
FIGS. 1A and 1B depict an illustrative computing environment for implementing dynamical authentication functions in accordance with one or more aspects described herein.
Figure 1B:
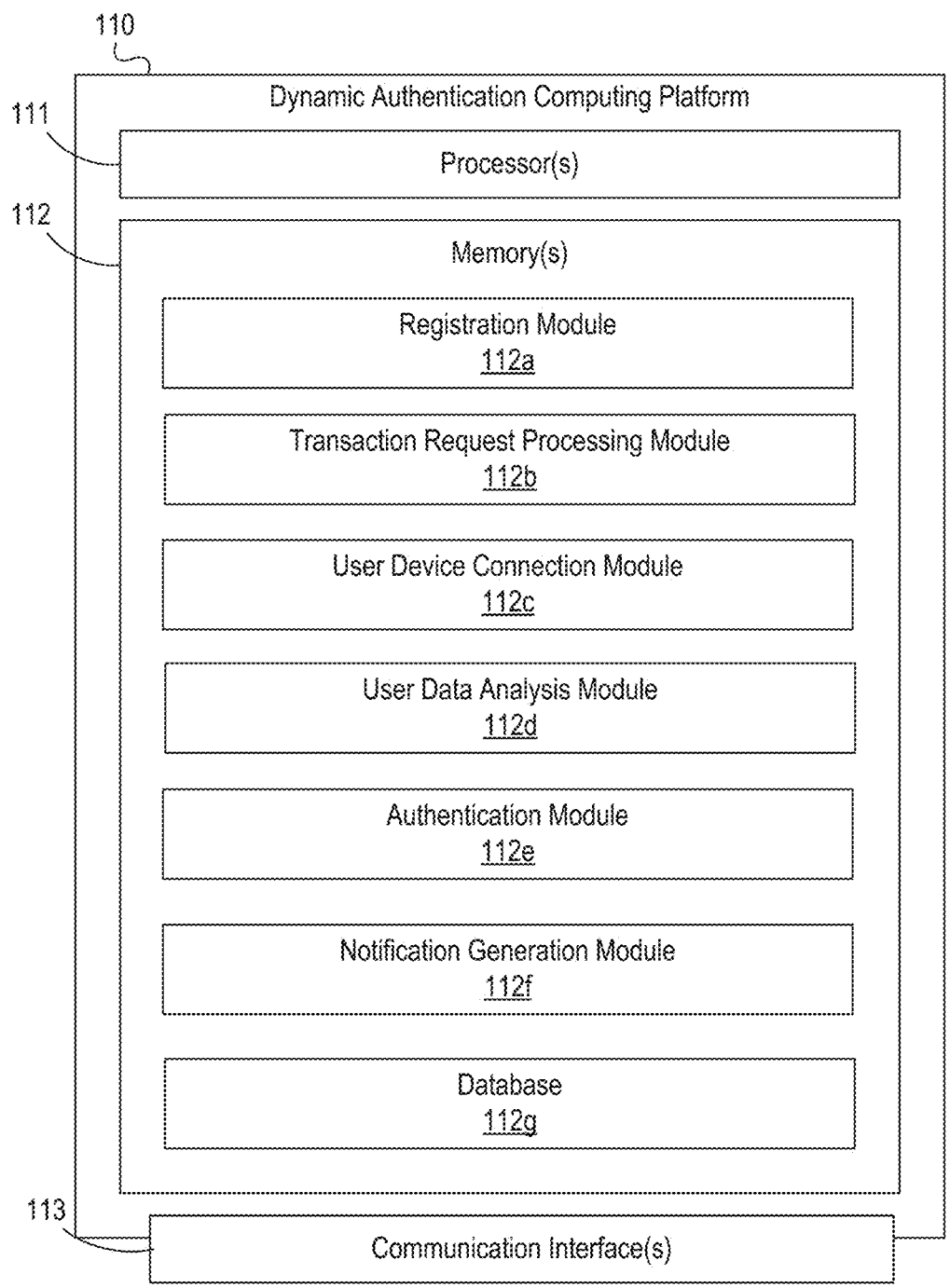

FIGS. 1A-1B depict an illustrative computing environment for implementing and using dynamically generated authentication questions based on user data in accordance with one or more aspects described herein. Referring to FIG. 1A, computing environment 100 may include one or more computing devices and/or other computing systems. For example, computing environment 100 may include dynamic authentication computing platform 110, internal entity computing system 120, internal entity computing device 140, external entity computing system 150, user computing device 170, and user computing device 175. Although one internal entity computing systems 120, one internal entity computing device 140, one external entity computing system 150, and two user devices 170, 175 are shown, more or fewer devices or systems may be used without departing from the invention.

Dynamic authentication computing platform 110 may be configured to provide intelligent, dynamic, authentication functions based on captured user data in real-time or near real-time. For instance, dynamic authentication computing platform 110 may receive a request to process a transaction. For instance, dynamic authentication computing platform 110 may receive from, for instance, an external entity computing system 150 that may be or include a merchant point-of-sale system, a server processing online transactions, or the like, a request to process a transaction. In some instances, the request may be initiated by a user via a payment device such as a credit or debit card, a wearable device (e.g., a mobile payment application), a smartphone, or the like. In some examples, the transaction may be initiated by a user request that includes user identifying information, such as a name, unique user identifying number, or the like. Accordingly, in some examples, a user may initiate dynamic authentication even in situations where they do not have a physical card or other device to initiate the transaction. In some examples, if a physical card or other device is not present to initiate the transaction, additional authentication may be required (e.g., multiple dynamic authentication questions may be generated and presented to the user in order to be authenticated and process the transaction).

The dynamic authentication computing platform 110 may retrieve user and/or device data based on the transaction details associated with the request to process a transaction. For instance, the dynamic authentication computing platform 110 may retrieve from, for instance, an internal entity computing system 120, a device identifier to identify a device associated with a user requesting the transaction and that has been registered with the system. Additionally or alternatively, dynamic authentication computing platform 110 may continuously or on a periodic basis receive user or device data that may be stored for short periods of time (e.g., 2 hours, 8 hours, 24 hours, or the like) then overwritten such that there is no long term storage of user or device data.

In some examples (e.g., when data is not received continuously or on a periodic basis), dynamic authentication computing platform 110 may initiate a connection with the identified device and request user or device data (e.g., with permission of the user). For instance, data associated with purchases recently made (e.g., in past 24 hours, 48 hours, or the like), recent location data of the user, biometric data of the user capturing by the user device, or the like, may be requested. The user or device data may be received by the dynamic authentication computing platform 110 and one or more authentication questions may be dynamically generated based on the received data. For instance, a question such as, "Where was your smartphone located at 9:00 a.m. this morning" may be generated based on the received data. In another example, "at what store did you make a purchase yesterday at 7:30 p.m." may be generated. In some examples, the dynamically generated authentication question may include a range of correct answers or responses. For instance, if a user was running between 1:00 p.m. and 2:00 p.m. yesterday, a question such as "What time were you running yesterday?" may have various correct answers or responses within the range of 1:00 p.m. to 2:00 p.m. (e.g., 1:15, 1:25, 1:40, or the like). Various other authentication questions may be dynamically generated without departing from the invention.

The dynamically generated authentication question may be transmitted to the external entity computing system 150 for display and user input may be received that is responsive to the question. If the user input matches the data retrieved from the user device, the user may be authenticated and the transaction may be processed. If the data does not match, additional authentication data may be requested (e.g., another authentication question may be dynamically generated, traditional authentication data may be requested, or the like).

Internal Entity computing system 120 may be computing systems or devices (e.g., servers, server blades, or the like) including one or more components (e.g., memories, processors, and the like) associated with the entity or enterprise organization implementing the dynamic authentication computing platform 110. In some examples, internal entity computing system 120 may include systems or may host applications that may store data related to registered users, user computing devices, user account information, and the like. This data may be retrieved to identify a user computing device with which to establish a connection to retrieve user data.

Internal entity computing device 140 may be a desktop computing device, laptop computing device, mobile computing device, or the like, that may be used by an employee of the enterprise organization implementing the dynamic authentication computing platform 110. Internal entity computing device 140 may be used to generate or modify rules for matching criteria (e.g., if received data matches within a certain percentage a match may be considered), may generate or modify rules controlling which types of device or user data to prioritize when dynamically generating questions (e.g., purchase data vs. location data vs. activity data, or the like), and the like.

External entity computing system 150 may include one or more computing devices or systems (e.g., servers, server blades, or the like) including one or more components (e.g., memories, processors, and the like) and may be associated with one or more entities other than the enterprise organization implementing the dynamic authentication computing platform 110. For instance, external entity computing system 150 may be or include a merchant point-of-sale (POS) device or terminal, a merchant payment processing system (e.g., for online transactions or the like), and the like.

User computing device 170 and/or user computing device 175 may be or include one or more computing devices associated with a user (e.g., a user registered with the system or customer of the enterprise organization requesting dynamic authentication). User computing device 170 and/or user computing device 175 may include a smartphone, smart watch or other wearable device, laptop computer, desktop computer, tablet device, or the like. User computing device 170, 175 may be a pre-registered device configured to capture user data and transmit user or device data to dynamic authentication computing platform as requested or on a continuous or periodic basis. In some examples, user computing device 170 and/or user computing device 175 may be associated with a same user. In some arrangements, data may be retrieved from one or more of user computing device 170 and/or user computing device 175 to dynamically generate one or more authentication questions. Alternatively, user computing device 170 and user computing device 175 may be associated with different users of the systems or arrangements described herein.

Computing environment 100 also may include one or more computing platforms. For example, and as noted above, computing environment 100 may include dynamic authentication computing platform 110. As illustrated in greater detail below, dynamic authentication computing platform 110 may include one or more computing devices configured to perform one or more of the functions described herein. For example, dynamic authentication computing platform 110 may include one or more computers (e.g., laptop computers, desktop computers, servers, server blades, or the like).

As mentioned above, computing environment 100 also may include one or more networks, which may interconnect one or more of dynamic authentication computing platform 110, internal entity computing system 120, internal entity computing device 140, external entity computing system 150, user computing device 170, and/or user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic authentication computing platform 110, internal entity computing system 120, internal entity computing device 140, may be associated with an organization (e.g., a financial institution), and private network 190 may be associated with and/or operated by the organization, and may include one or more networks (e.g., LANs, WANs, virtual private networks (VPNs), or the like) that interconnect dynamic authentication computing platform 110, internal entity computing system 120, internal entity computing device 140, and one or more other computing devices and/or computer systems that are used by, operated by, and/or otherwise associated with the organization. Public network 195 may connect private network 190 and/or one or more computing devices connected thereto (e.g., dynamic authentication computing platform 110, internal entity computing system 120, internal entity computing device 140) with one or more networks and/or computing devices that are not associated with the organization. For example, external entity computing system 150, user computing device 170, and/or user computing device 175, might not be associated with an organization that operates private network 190 (e.g., because external entity computing system 150, user computing device 170, and/or user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 150, user computing device 170, and/or user computing device 175, to private network 190 and/or one or more computing devices connected thereto (e.g., dynamic authentication computing platform 110, internal entity computing system 120, internal entity computing device 140).

Referring to FIG. 1B, dynamic authentication computing platform 110 may include one or more processors 111, memory 112, and communication interface 113. A data bus may interconnect processor(s) 111, memory 112, and communication interface 113. Communication interface 113 may be a network interface configured to support communication between dynamic authentication computing platform 110 and one or more networks (e.g., private network 190, public network 195, or the like). Memory 112 may include one or more program modules having instructions that when executed by processor(s) 111 cause dynamic authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic authentication computing platform 110 and/or by different computing devices that may form and/or otherwise make up dynamic authentication computing platform 110.

For example, memory 112 may have, store and/or include a registration module 112a. Registration module 112a may store instructions and/or data that may cause or enable the dynamic authentication computing platform 110 to receive a user request to register with the system and generate a user record associated with the user. In some examples, the registration data received and/or user record may include a user identifier, account identifier, device identifier, or the like. In some examples, the user record may include a user identifier that is used to identify a user based on transaction details received in a request for transaction and use the identified user data to retrieve additional user or device data (e.g., a device identifier of a user computing device associated with the user and stored in, for instance, internal entity computing system 120).

Dynamic authentication computing platform 110 may further have, store and/or include transaction request processing module 112b. Transaction request processing module 112b may store instructions and/or data that may cause or enable the dynamic authentication computing platform 110 to receive a request to process a transaction as well as details of the transaction such as an amount, type, parties to the transaction, and the like. The request may include a user identifier that may be used to retrieve user device data including an identifier associated with one or more user devices.

Dynamic authentication computing platform 110 may further have, store and/or include user device connection module 112c. User device connection module 112c may store instructions and/or data that may cause or enable the dynamic authentication computing platform 110 to initiate, based on user computing device identifying information, a connection or otherwise communicate with the identifier user computing device(s). User device connection module 112c may further transmit or send a request for user or device data to the connected user computing device(s) and may receive response data from those devices.

Dynamic authentication computing platform 110 may further have, store and/or include user data analysis module 112d. User data analysis module 112d may store instructions and/or data that may cause or enable the dynamic authentication computing platform 110 to analyze user or device data received by the user device connection module 112c to identify one or more metrics or data points associated with the user or user device. Based on the identifier user metrics or data points, one or more authentication questions may be dynamically generated and transmitted for display to a user. In some examples, user data analysis module 112d may delete or overwrite received user data based on a triggering event, an elapsed period of time, or the like. For instance, user data may be deleted or overwritten every 8 hours, 24 hours, or the like. Additionally or alternatively, user data may be deleted upon the requested transaction being processed. Accordingly, new user or device data may be requested and received to generate additional authentication questions after a first or previous authentication question has been generated or used.

Dynamic authentication computing platform 110 may further have, store and/or include authentication module 112e. Authentication module 112e may store instructions and/or data that may cause or enable the dynamic authentication computing platform 110 to analyze user response data received in response to the authentication question and determine whether the response data matches the identified user metrics or data points. In some examples, a minimum threshold for a match may be identified. For instance, at least 90%, 80%, 75% or the like, of characters in the response data must match the user identified data points or metrics to be considered a match. The threshold for matching may be modifiable (e.g., by an enterprise organization user via internal entity computing device 140, by a user during registration, or the like). Authentication module 112e may output an authentication output (e.g., transaction denied, transaction approved, additional authentication data needed, or the like) based on the analysis.

Dynamic authentication computing platform 110 may further have, store and/or include notification generation module 112f. Notification generation module 112f may store instructions and/or data that may cause or enable the dynamic authentication computing platform 110 to generate one or more notifications approving or denying the transaction, transmitting notifications to external entity computing system 150, user computing device 170, or the like. In some examples, if additional authentication data is requested, the notification generation module 112f may generate a notification requesting additional authentication data.

Dynamic authentication computing platform 110 may further have, store and/or include database 112g. Database 112g may store data associated with authentication outputs, requested transactions, and the like.

FIGS. 2A-2G depict one example illustrative event sequence for implementing and using dynamic authentication functions in accordance with one or more aspects described herein. The events shown in the illustrative event sequence are merely one example sequence and additional events may be added, or events may be omitted, without departing from the invention. Further, one or more processes discussed with respect to FIGS. 2A-2G may be performed in real-time or near real-time.

Figure 2A:
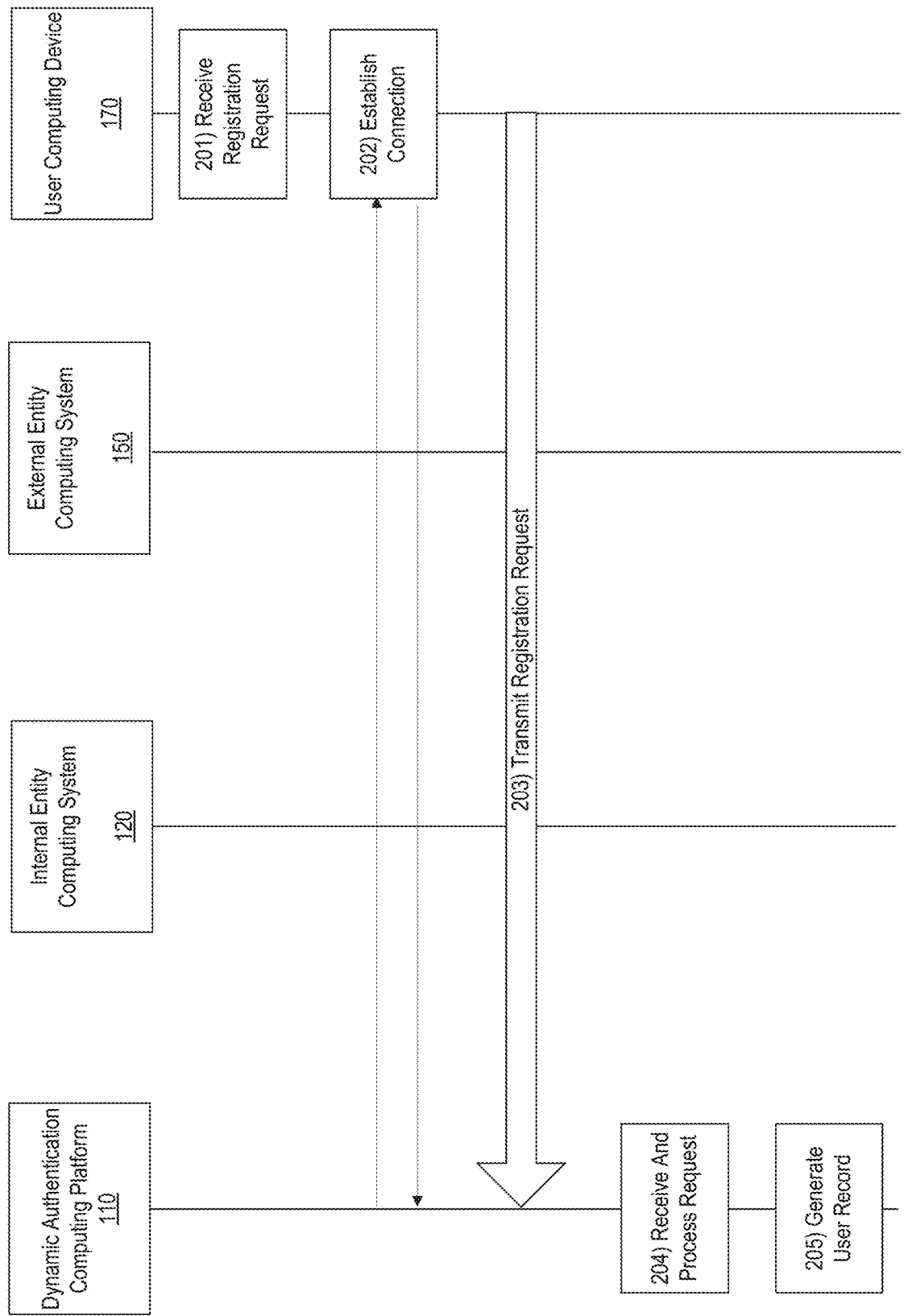
FIGS. 2A-2G depict an illustrative event sequence for implementing dynamic authentication functions in accordance with one or more aspects described herein.

With reference to FIG. 2A, at step 201, a registration request may be received by, for instance, user computing device 170. For instance, a user may input a request to register for dynamic authentication into the user computing device 170 (e.g., via a touchscreen, keypad, or the like) and via an application executing on the user computing device 170 (e.g., an application associated with the enterprise organization such as a mobile banking application, online banking application, or the like). In some examples, the registration request may include user identifying data, user computing device 170 identifying data, user account data, or the like. In some arrangements, registration data may include user authentication data that may be pre-stored and used if dynamic authentication functions are unavailable, if the user incorrectly answers a predetermined number of dynamic authentication questions incorrectly, or the like.

At step 202, user computing device 170 may connect to dynamic authentication computing platform 110. For instance, a first wireless connection may be established between the user computing device 170 and the dynamic authentication computing platform 110. Upon establishing the first wireless connection, a communication session may be initiated between user computing device 170 and the dynamic authentication computing platform 110.

At step 203, user computing device 170 may transmit or send the request for registration, and registration data, to the dynamic authentication computing platform 110. For instance, the request for registration and registration data may be transmitted during the communication session initiated upon establishing the first wireless connection.

At step 204, dynamic authentication computing platform 110 may receive the registration request and may process the request. For instance, dynamic authentication computing platform 110 may evaluate the received data to determine whether additional data should be requested, whether user data or device data is stored in internal entity computing system 120, or the like.

At step 205, based on sufficient data for registration being received, dynamic authentication computing platform 110 may generate a user record. For instance, a database may be updated or modified to include a user record associated with the user requesting registration.

Figure 2B:
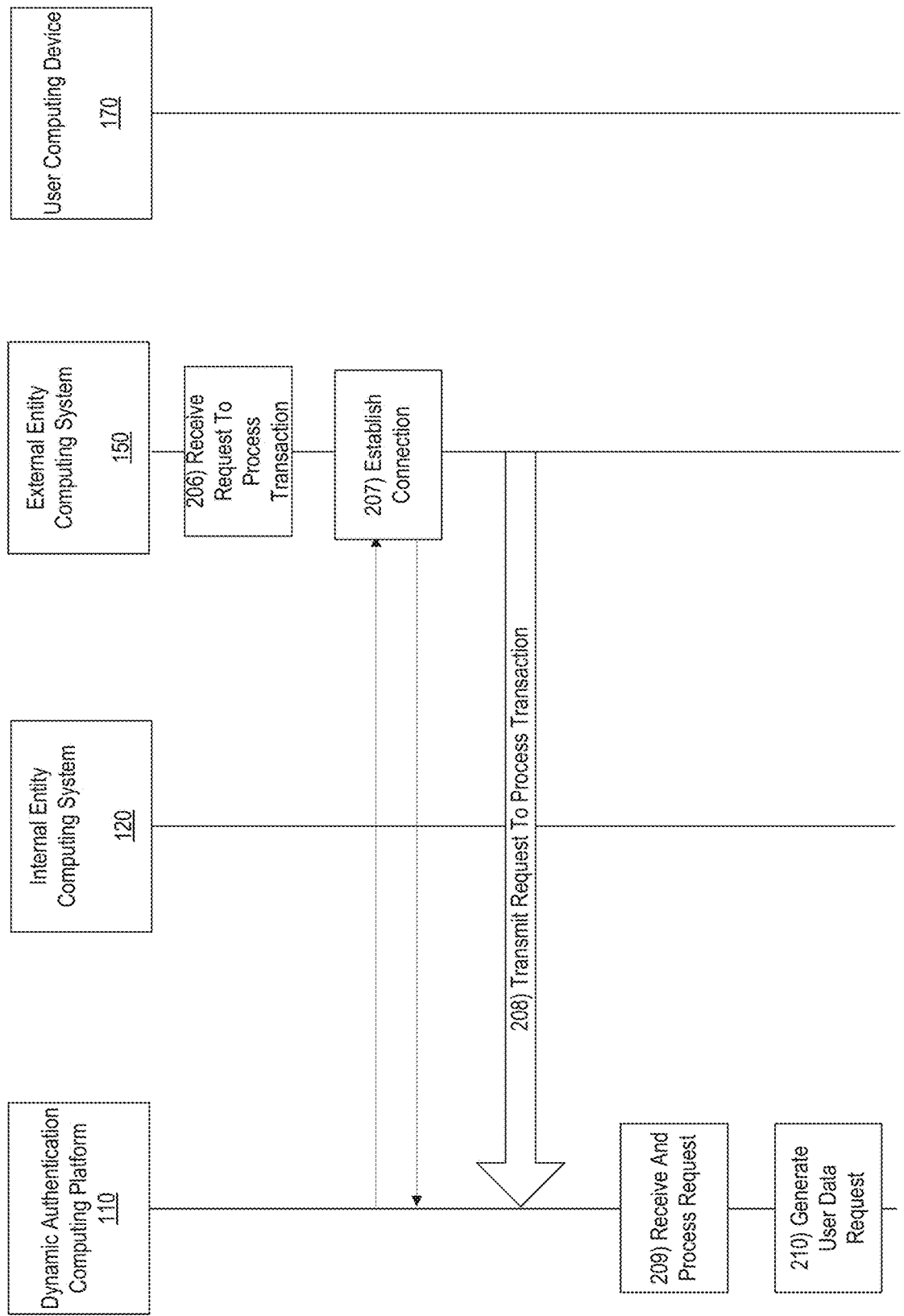

With reference to FIG. 2B, at step 206, external entity computing system 150 may receive a request to process a transaction. For instance, a user may initiate a transaction at a merchant POS, online via a merchant website, or the like, using, for instance, a payment device such as a credit or debit card, a mobile payment application, wearable device, or the like. In some examples, such as if a user does not have a payment device associated with an account being used, or the like, the user may initiate the transaction request by providing user identifying information such as a name, unique identifying number, or the like, to initiate or request processing of a transaction. The request may be received by the merchant system (e.g., external entity computing system 150).

At step 207, external entity computing system 150 may connect to dynamic authentication computing platform 110. For instance, a second wireless connection may be established between the external entity computing system and the dynamic authentication computing platform 110. Upon establishing the second wireless connection, a communication session may be initiated between external entity computing system 150 and the dynamic authentication computing platform 110.

At step 208, external entity computing system 150 may transmit or send the request to process the transaction to the dynamic authentication computing platform 110. For instance, the request to process the transaction may be transmitted or sent during the communication session initiated upon establishing the second wireless connection. In some examples, the request to process the transaction may include user or account identifiers, transaction details such as type, amount, and the like, merchant identifiers, and the like.

At step 209, the dynamic authentication computing platform 110 may receive and process the request to process the transaction. For instance, the dynamic authentication computing platform 110 may receive the request to process the transaction and extract data to identify a user associated with the transaction, as well as other details.

At step 210, dynamic authentication computing platform 110 may generate a request for user data. For instance, based on, for instance, a user identifier received in the request to process a transaction, a request for additional user data, such as a device associated with the user, may be generated.

Figure 2C:
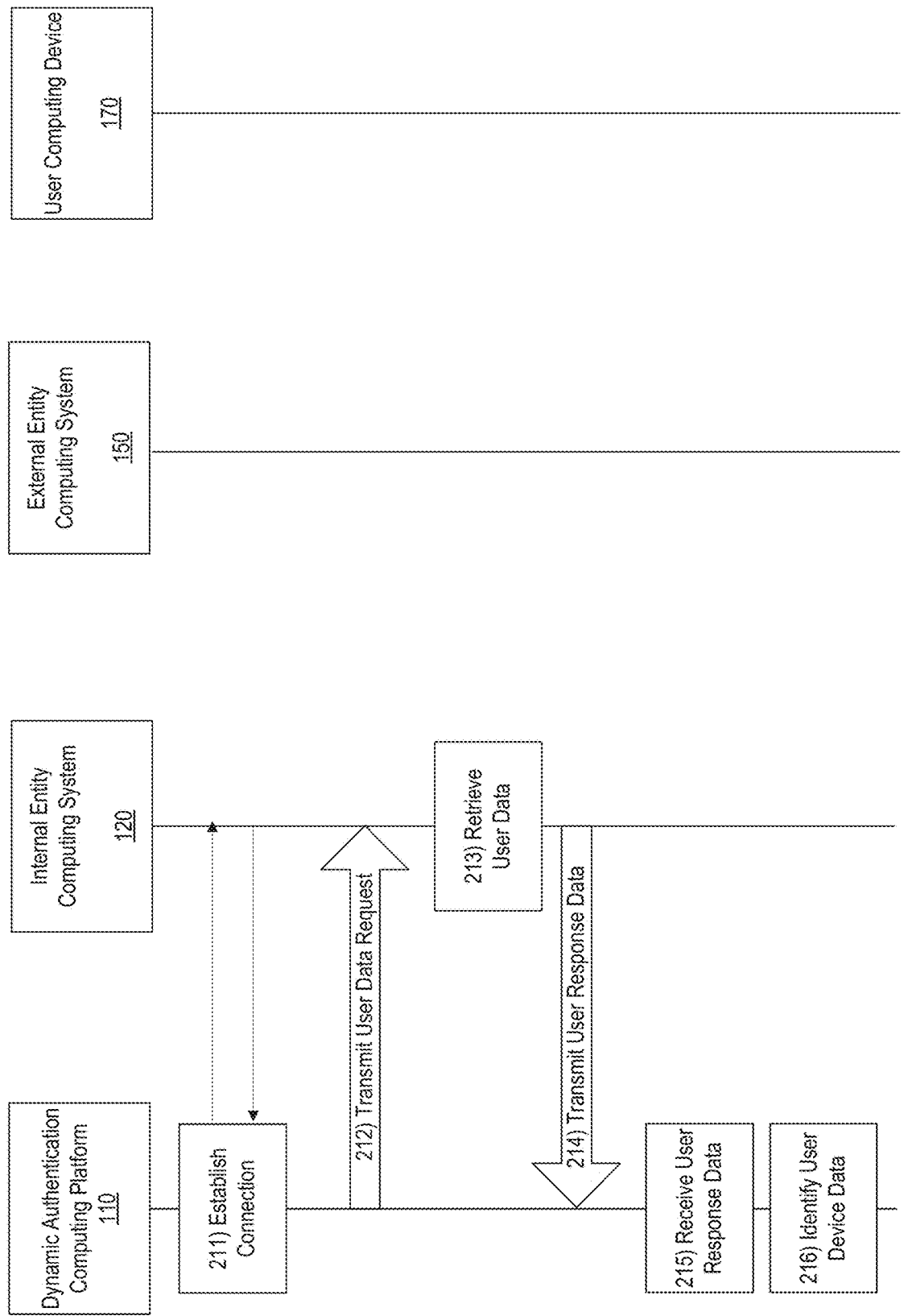

With reference to FIG. 2C, at step 211, dynamic authentication computing platform 110 may connect to internal entity computing system 120. For instance, a third wireless connection may be established between the dynamic authentication computing platform 110 and the internal entity computing system 120. Upon establishing the third wireless connection, a communication session may be initiated between dynamic authentication computing platform 110 and internal entity computing system 120.

At step 212, the dynamic authentication computing platform 110 may transmit or send the request for user data to internal entity computing system 120. For instance, the request for user data may be transmitted or sent during the communication session initiated upon establishing the third wireless connection.

At step 213, internal entity computing system 120 may receive the request for user data and retrieve the requested user data. For instance, internal entity computing system 120 may identify, based on user identifying information, one or more user computing devices associated with the user.

At step 214, internal entity computing system 120 may transmit or send user response data to the dynamic authentication computing platform 110. For instance, data associated with the identified one or more user computing devices may be transmitted or sent as user response data.

At step 215, dynamic authentication computing platform 110 may receive the user response data (e.g., the user computing device data). And at step 216, a device of the user may be identified (e.g., a first user computing device such as user computing device 170). For instance, a wearable device (e.g., a smart watch, a wearable device associated with the system described and issued by an enterprise organization, or the like) a smart phone, a tablet, or the like, of the user may be identified. In some examples, the identified user computing device may include a pre-registered device identified by the user during the registration process.

Figure 2D:
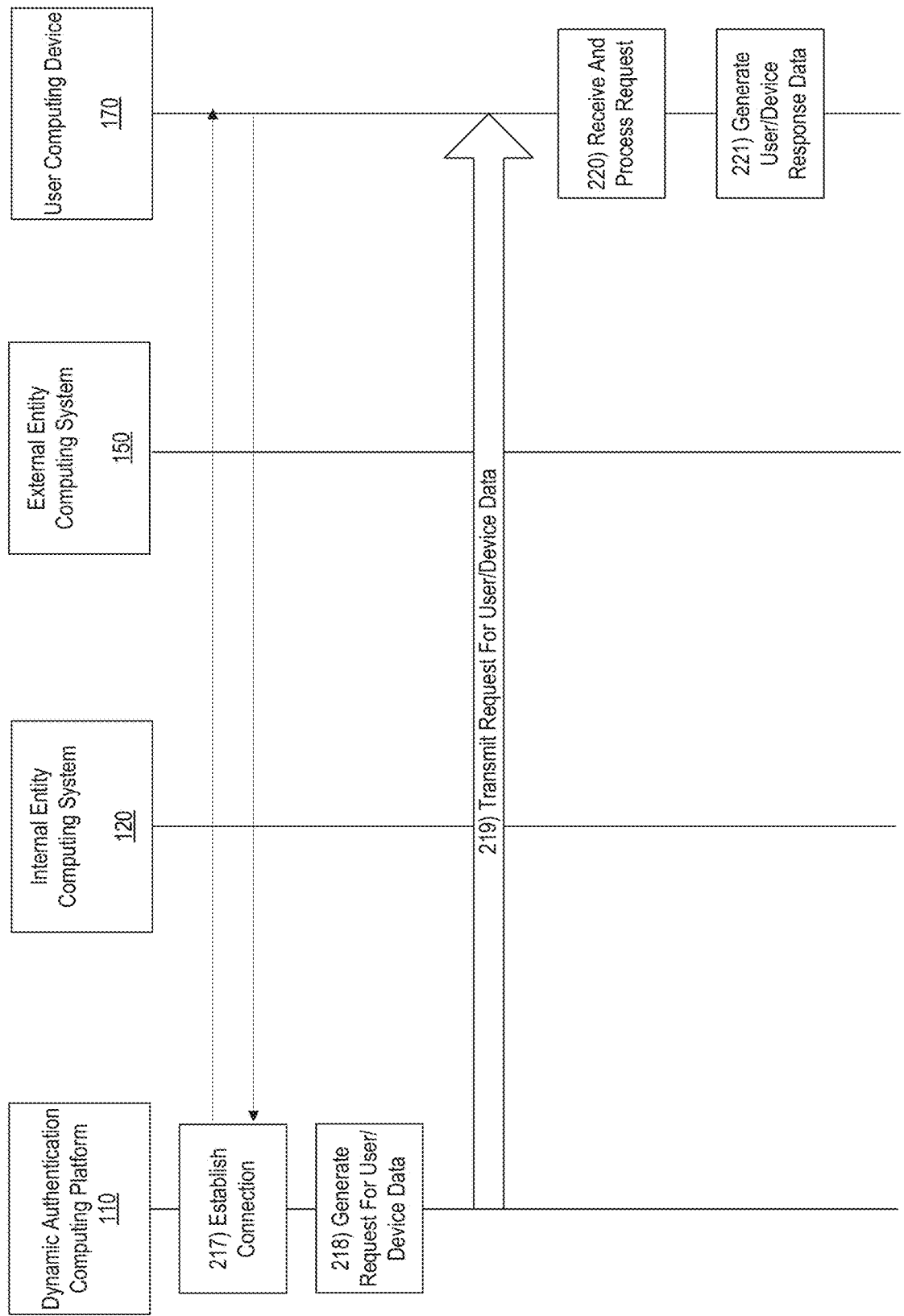

With reference to FIG. 2D, at step 217, dynamic authentication computing platform 110 may connect to user computing device 170. For instance, a fourth wireless connection may be established between the dynamic authentication computing platform 110 and the user computing device 170. Upon establishing the fourth wireless connection, a communication session may be initiated between dynamic authentication computing platform 110 and user computing device 170.

At step 218, dynamic authentication computing platform 110 may generate a request for user and/or device data for use in dynamically generating one or more authentication questions. For instance, a request for data such as recent purchase history, recent location data, recent activity data (e.g., movement data, or the like), may be generated. This data may be captured by the user computing device 170 during the normal course of use by the user (e.g., as the user travels to work, school, home, makes purchases, exercises, or the like).

At step 219, the dynamic authentication computing platform 110 may transmit or send the generated request for user or device data to the user computing device 170. For instance, the request may be transmitted or sent during the communication session established upon initiated the fourth wireless connection.

At step 220, user computing device 170 may receive and process the request for user and/or device data. For instance, user computing device 170 may process the request and retrieve the requested data.

At step 221, user or device response data may be generated by the user computing device 170. For instance, the retrieved requested data may be used to generate user or device response data.

In some examples in which user or device data is continuously or periodically transmitted to dynamic authentication computing platform 110, one or more of steps 210-221 may be omitted.

Figure 2E:
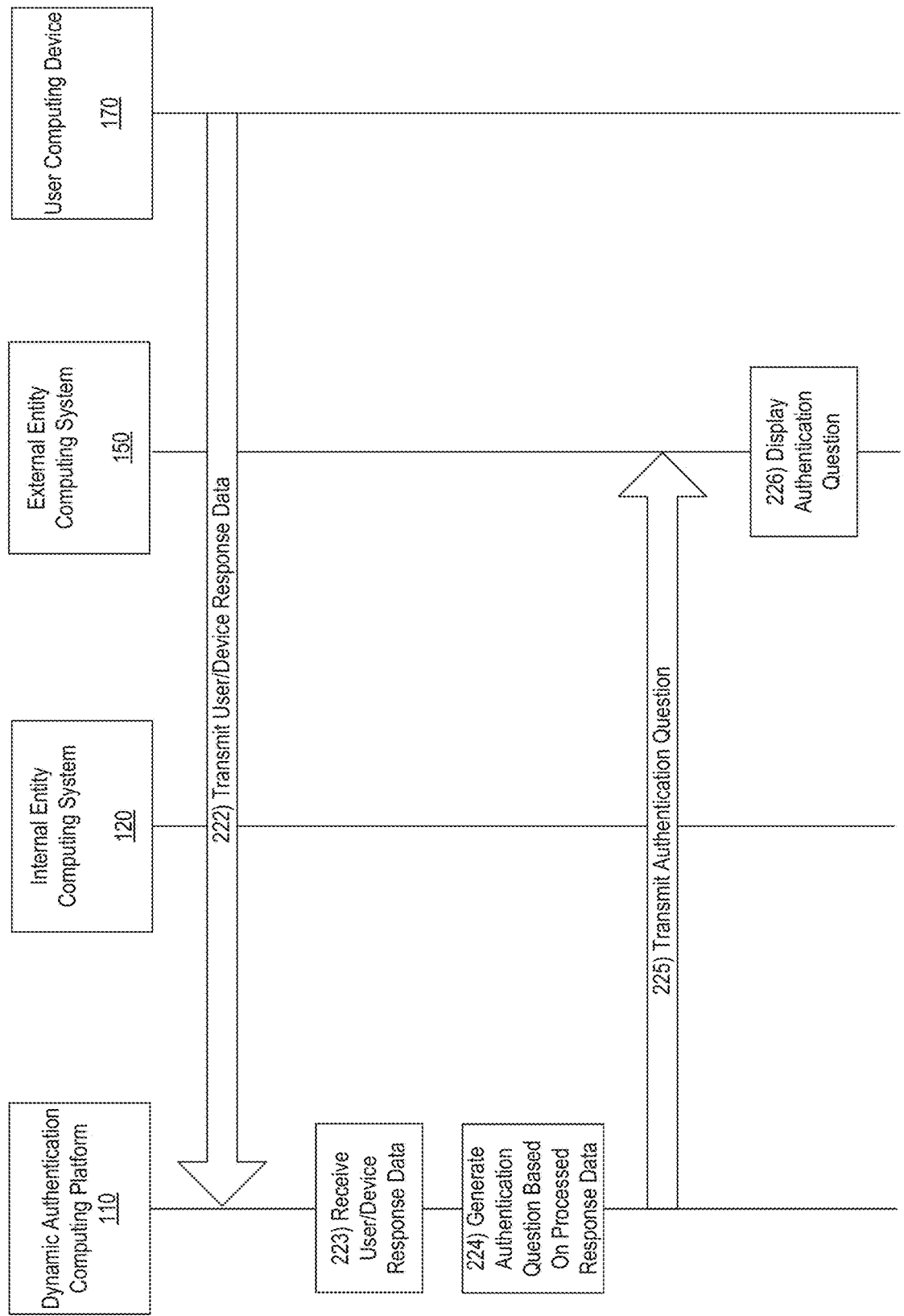

With reference to FIG. 2E, at step 222, user computing device may transmit or send the user or device response data to the dynamic authentication computing platform 110.

At step 223, dynamic authentication computing platform 110 may receive and process the user or device response data. For instance, dynamic authentication computing platform 110 may parse the received data and categorize the data (e.g., purchase data, movement data, location data, or the like). In some examples, different categories of data may have a higher priority for use as authentication questions. For instance, in some examples, movement data may be a first priority for generating authentication questions, while purchase data may be a second priority and location data may be a third priority. Various other priority arrangements may be used without departing from the invention.

In some examples, processing the data may include identifying one or more user metrics or data points that may provide a basis for authentication. For instance, within a purchase category, one or more recent purchases and associated merchants, as well as time of transaction/or date of transaction, may be identified as user metrics or data points to provide a basis for a dynamically generated authentication question.

At step 224, one or more authentication questions may be dynamically generated based on the processed user or device data. For instance, based on the receive user and/or device data, a question such as "did you make a housewares purchase yesterday?" may be generated based on purchase history data captured from the user computing device 170. This example question may be made based on identifying one or more user metrics or data points associated with a purchase dated the day before and that may be identified as an acceptable answer or response to the dynamically generated authentication question. In another example, "did you get a workout in yesterday?" or "About how many miles did you run yesterday?" may be generated based, for instance, on movement data associated with the user computing device 170 and based on user metrics or data points indicating how far a user ran on a previous day that may be used or identified as an acceptable answer to the dynamically generated authentication question. Various other questions or types of questions may be generated without departing from the invention.

At step 225, dynamic authentication computing platform 110 may transmit or send the one or more dynamically generated authentication questions to the external entity computing system 150. In some examples, transmitting the one or more dynamically generated authentication questions to the external entity computing system 150 may cause the external entity computing system 150 to display the one or more dynamically generated authentication questions.

At step 226, the external entity computing system 150 may receive and display the one or more generated authentication questions. For instance, the one or more authentication questions may be displayed on, for instance, a merchant point-of-sale system display, a user computing device in communication with a merchant server via, for instance, a merchant website, or the like.

Although the arrangement shown in FIG. 2E includes transmitting the dynamically generated authentication questions to the external entity computing system 150 for display, in some examples, such as when a user is making an online purchase using a user computing device (e.g., user computing device 170) the dynamically generated authentication questions may be transmitted to the user computing device 170 for display, response, and the like.

Figure 2F:
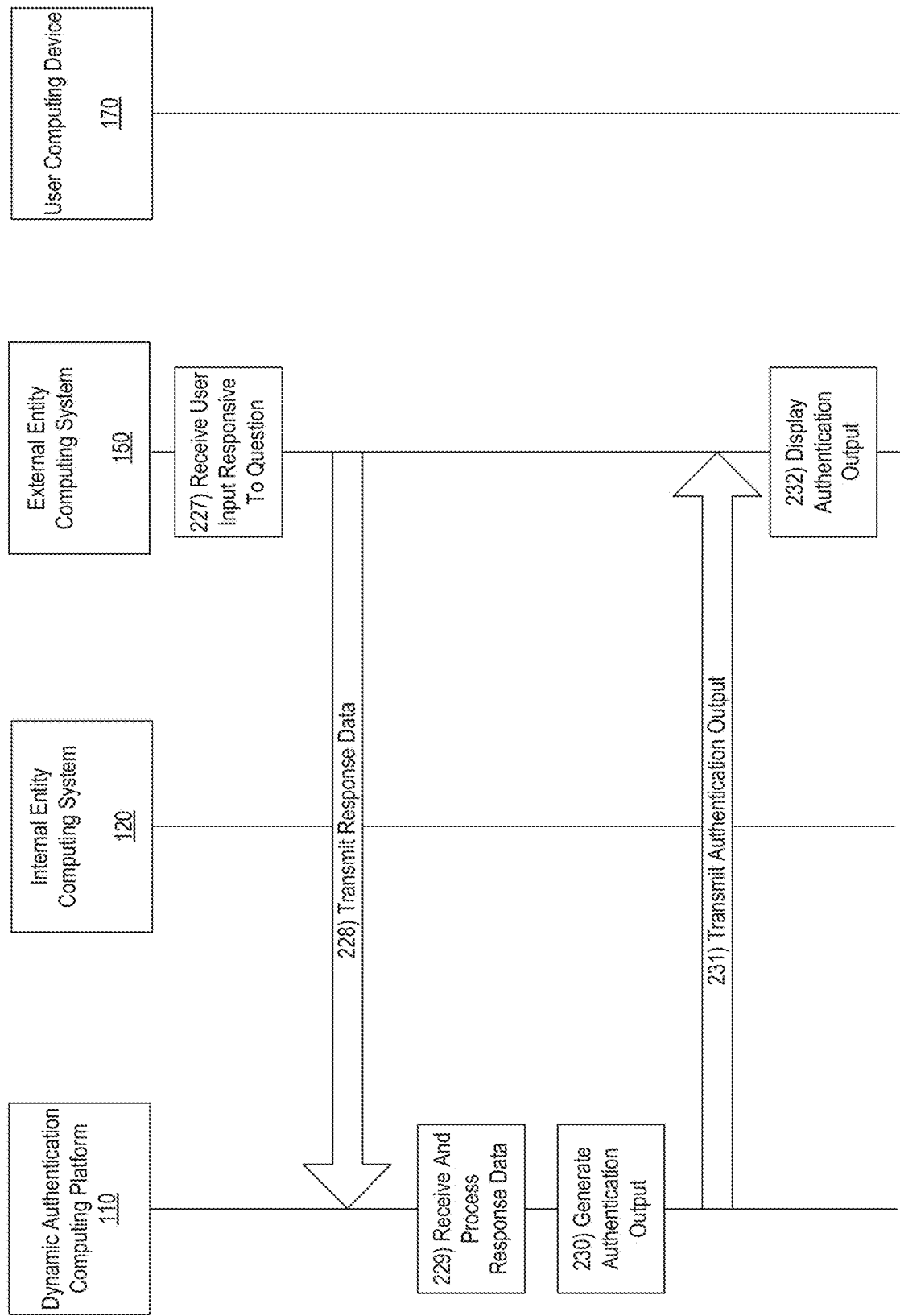

With reference to FIG. 2F, at step 227, external entity computing system 150 may receive user input including input responsive to the dynamically generated authentication question. For instance, a user may provide input via, for example, the merchant POS in response to the displayed authentication question.

At step 228, external entity computing system 150 may transmit or send the user response data generated based on the user input to the dynamic authentication computing platform 110.

At step 229, the dynamic authentication computing platform 110 may receive the user response data and may process the user response data. For instance, dynamic authentication computing platform 110 may compare the user response data to the one or more user metrics or data points used to generate the dynamically generated authentication question and that may be identified as acceptable answers to the dynamically generated authentication questions. Based on this analysis, an authentication output may be generated at step 230. For instance, if the received user response data matches the data points, the authentication output may indicate that the transaction is authorized. Alternatively, if there is no match, or an insufficient match, the authentication output may indicate that the transaction is denied or may request additional authentication data in order to process the transaction.

At step 231, the generated transaction output may be transmitted by the dynamic authentication computing platform 110 to the external entity computing system 150. In some examples, transmitting the authentication output may cause the external entity computing system 150 to display the authentication output.

At step 232, external entity computing system 150 may display the authentication output.

Figure 2G:
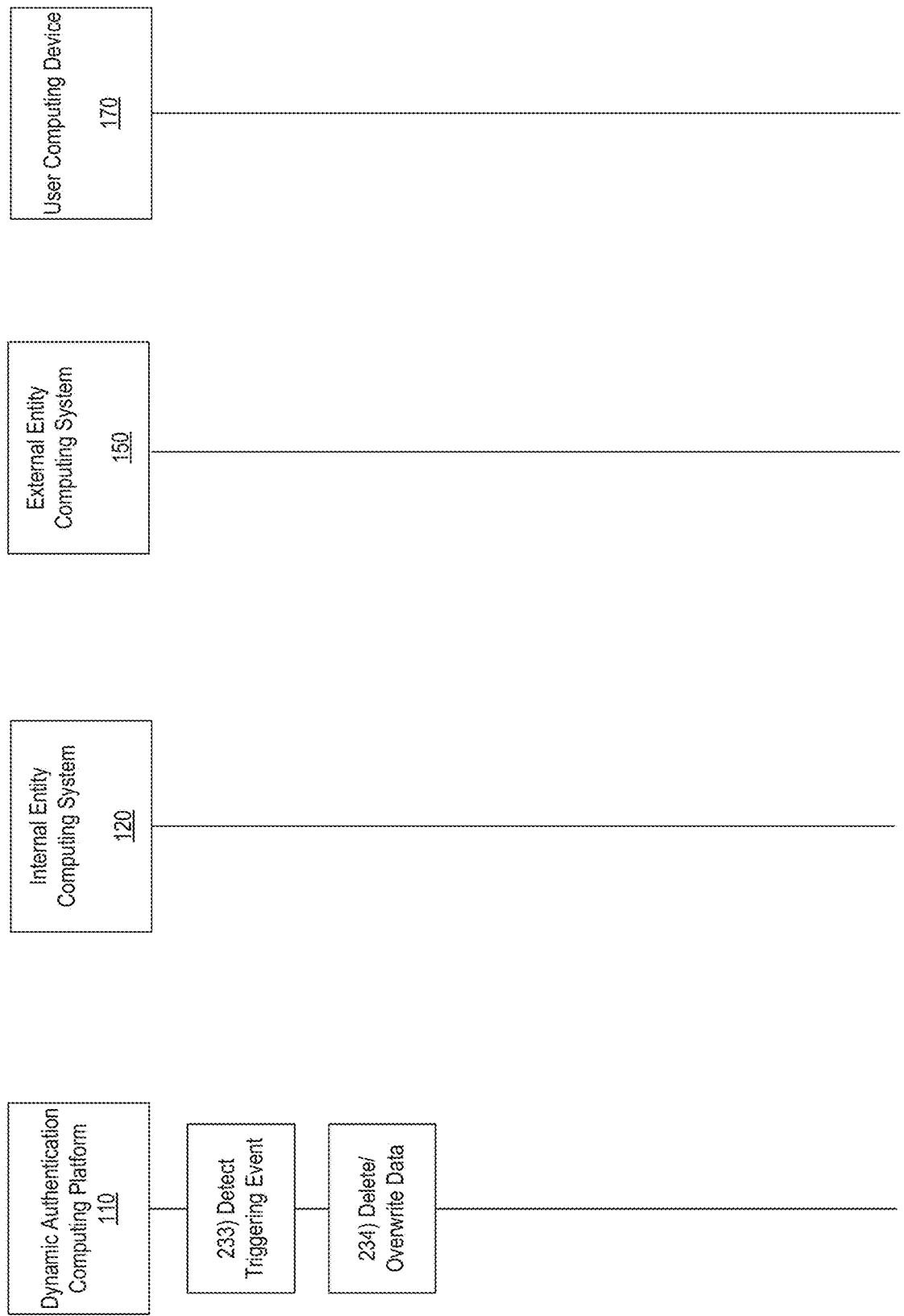

With reference to FIG. 2G, at step 233, dynamic authentication computing platform 110 may detect a triggering event related to deletion of user data. For instance, if user data (e.g., data received from one or more user devices) is scheduled for deletion after a predetermined time, on a predetermined schedule, or the like, dynamic authentication computing platform 110 may detect that the predetermined time has expired or a time for scheduled deletion is detected. Upon detecting the triggering event, at step 234, the received user data may be deleted by the dynamic authentication computing platform 110. Accordingly, user data may be saved for a very short period of time (e.g., 4 hours, 8 hours, 24 hours, or the like), if at all (e.g., in some examples, data may be received, questions generated and corresponding answers identified, and the data deleted). Accordingly, risk of user data being inadvertently shared or compromised may be reduced or eliminated.

In some examples, each time user data is received it may overwrite previously received data (e.g., a triggering event may include receipt of subsequent user data from a user computing device which may cause the system to overwrite any previous data with the newly received data).

Figure 3:
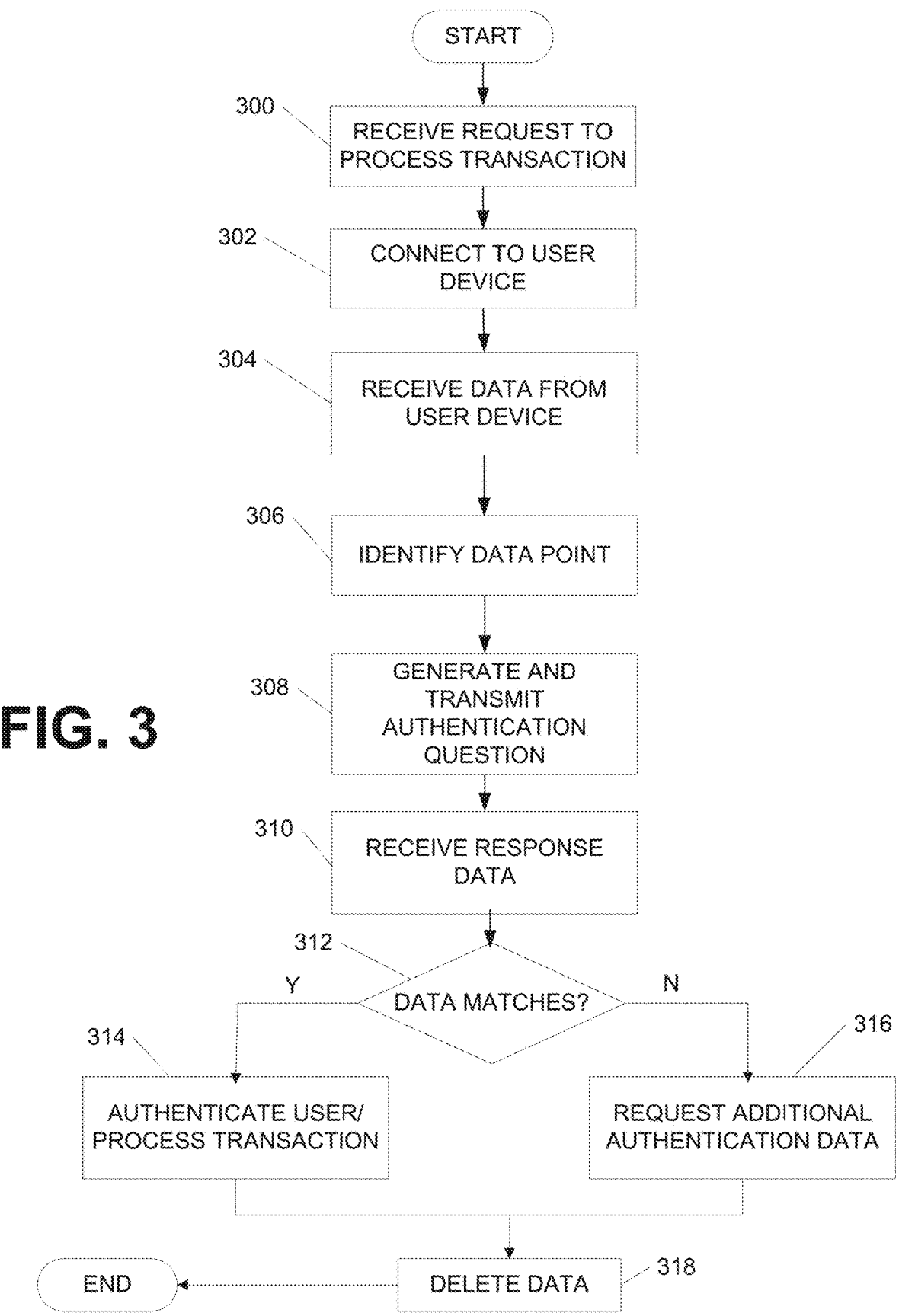
FIG. 3 illustrates an illustrative method for implementing dynamic authentication functions according to one or more aspects described herein.

FIG. 3 is a flow chart illustrating one example method of implementing dynamic authentication functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a request to process a transaction may be received. In some examples, the request to process the transaction may be received from an external entity computing device, such as a merchant point-of-sale device or system, a merchant computing device accessed by a user requesting the transaction via a merchant website, or the like. In some examples, the user may initiate the transaction via a payment device, such as a credit card or debit card. Additionally or alternatively, the user may initiate the transacting using a user computing device 170, such as a wearable device, smart phone, tablet, or the like. In some examples, the user might not have a physical device, such as a payment device or user computing device 170 to initiate a transaction. In such arrangements, the user may request processing of the transaction by, in some examples, providing a name or other user identifier.

At step 302, responsive to receiving the request to process the transaction, the dynamic authentication computing platform 110 may initiate a connection to the user computing device 170 or other user computing device. For instance, a connection may be established between the dynamic authentication computing platform 110 and one or more user computing device 170, 175 to initiate communication between the devices. In some examples, the connection may be established directly between the dynamic authentication computing platform 110 and the user computing device 170, 175. Additionally or alternatively, the connection may be established between the external entity computing device (e.g., merchant POS) and the user computing device 170, 175 (e.g., via, for example, near-field communication) and between the dynamic authentication computing platform 110 to establish communication between all devices or systems. In arrangements in which user data is continuously or periodically received by the dynamic authentication computing platform 110, this step may be omitted.

At step 304, user and/or device data may be received from the user computing device 170 with which a connection was established. For instance, a request for recent (e.g., past 24 hours, past 48 hours, or the like) data captured by the user computing device 170 may be generated and transmitted to the user computing device 170. In some examples, the requested and/or received data may include location data, purchase data, movement data, and the like, captured and received with permission of the user (e.g., during a registration process).

At step 306, the user or device data may be received and analyzed to identify one or more user metrics or data points. For instance, the data may be analyzed to identify data points or metrics that may provide a basis for one or more dynamically generated authentication question and may constitute an acceptable or correct answer to the generated authentication questions.

At step 308, one or more authentication questions may be dynamically generated based on the identified user data points or metrics. The generated one or more authentication questions may then be transmitted to the external entity computing device (or, in some examples, user computing device 170) for display on the device. In some examples, transmitting the authentication question may cause the authentication question to be displayed on the device as, for instance, a user interface including or prompting a user to respond with authentication response data. For instance, FIG. 4 illustrates one example interface 400 including a dynamically generated authentication question. The interface includes field 402 into which the user may enter user response data. Based on the question provided, more than one correct or acceptable response may be available. For instance, with respect to the example in FIG. 4, the user was likely at location X for a range of time. Accordingly, any time within the range that the user was at the location may be considered a correct or acceptable answer.

FIG. 5 illustrates another example user interface 500 presenting a dynamically generated authentication question.

The arrangement of FIG. 5 provides multiple selectable options from which the user may choose when responding to the dynamically generated authentication question.

With further reference to FIG. 3, at step 310, user authentication response data may be received. For instance, a user may provide user input responsive to the displayed question which may then be received by the dynamic authentication computing platform 110.

At step 312, a determination may be made as to whether the user authentication response data matches the data point or metric identified from the received user data. If so, the user may be authenticated and the transaction authorized at step 314. If the user authentication response data does not match the identified data points or metrics, in some examples, the requested transaction may be denied and/or additional authentication data may be requested at step 316. For instance, one or more additional questions may be generated and presented, a request for biometric data may be provided to the user, or the like.

At step 318, the received user data may be deleted by the dynamic authentication computing platform 110. In some examples, this may be in response to detection of a triggering event (e.g., question was presented and answered, a predetermined time period has elapsed, new data has been received to overwrite previous data, or the like). Accordingly, dynamic authentication computing platform 110 may store user data for a short period of time (e.g., 1 minute, 10 minutes, 4 hours, 24 hours, or the like), if at all.

Accordingly, aspects described here are directed to providing secure, dynamically generated authentication questions that may be used to authenticate a user with or without a physical device (e.g., debit card, credit card, user computing device, or the like). By retrieving, in real-time, recent user data and generating single use questions for the user, the system may reduce or eliminate the likelihood of unauthorized actors processing transactions. For instance, unlike static challenge questions that have corresponding static answers, the dynamically generated questions generated based on recent data may be difficult or impossible for an unauthorized user to answer correctly or determine data associated with a correct answer.

In some examples, the user data received and used as a basis for the dynamically generated authentication questions may be deleted, overwritten, or the like, in response to a triggering event (e.g., receipt of subsequent data, lapse of a period of time, or the like). This may add additional security in that user data is not stored by the system for an extended period. Further, in some examples, a generated authentication question may expire after a predetermined time (e.g., a predetermined time after being generated, a predetermined time after being presented, a predetermined time if not presented, or the like).

Further, as discussed herein, aspects described may be used in-person at, for instance, a merchant POS, as well as for online or mobile purchases in which the user may be authenticated without personal interaction with the user. In some examples, dynamically generated authentication questions may be transmitted to the external entity computing system 150 for display. Additionally or alternatively, the dynamically generated authentication question may be transmitted to the user computing device 170 for display (e.g., if a user is, for instance, making an online purchase).

In some aspects, the dynamically generated authentication questions may be used as security when minors are making purchases. For instance, a minor user may attempt a purchase, and, in response, a dynamically generated authentication question based on, for instance, data from a parent user device or other pre-registered device, may be transmitted to a parent user device for authentication. In some arrangements, the dynamically generated authentication question may also include details of the requested transaction (e.g., merchant, location, amount, type, or the like). Accordingly, the parent user can review the transaction being attempted by the minor and may, in some examples, deny the requested transaction, or may provide a response to the authentication question. Although this example is discussed in the context of a parent and minor child, this arrangement could be used for any people looking to have assistance in security and spending control.

For instance, in some examples, people may select an option to have multiple users answer dynamically generated authentication questions before making a purchase or processing a transaction. For instance, if a transaction is above a predetermined dollar amount, in some examples, two or more people may be required to answer dynamically generated authentication questions (e.g., generated based on data from their respective devices) before the transaction may be processed.

In some examples, a number or type of authentication question to authenticate the user and process the transaction may be based on an amount of the transaction. For instance, if an amount of a transaction is above a threshold, a user may be required to answer two or more dynamically generated authentication questions before authenticating the user and authorizing the transaction.

As discussed herein, in some examples, the dynamic authentication may be based on a wearable device of a user. For instance, the user may pre-register a wearable device that may, ins some examples, provide a first factor of authentication for a user (e.g., wearable may connect, e.g., via near-field communication, to the merchant POS). Once the wearable is detected or connected, data may be retrieved, or previously received data, from the wearable (e.g., movement data, or the like) and used to generate one or more authentication questions. The questions may be displayed (e.g., on the POS, on the wearable, or the like) and response data may be compared to data points in the retrieved data. However, even if the user does not have their wearable device, the transaction may still be initiated via, for instance, a user identifier.

In some examples, in pre-registering the wearable device, a unique identifier, token, key, or the like may be generated for the wearable device. Accordingly, any mapping of the wearable device to transactions or other data may be based on the unique identifier, rather than user identifying data. Accordingly, the user data may be less likely to be compromised because the wearable device does not identify or include any user identifying data.

In some examples, the user may be able to activate or deactivate the wearable device for use in generating the dynamic authentication questions, may be able to modify functionality of the wearable device (e.g., prevent transaction processing but enable tracking if the wearable is lost), or the like. Functionality may then be further modified (e.g., functionality restored) if the wearable is found.

In some examples, for instance, for in-store or in-person purchases, a biomarker may be used as an additional form of authentication. For instance, if logged into a registered user device using facial recognition, that login may be considered a form of authentication. In another example, a user may provide biometric data via the user device as an additional form of authentication, to initiate the dynamic authentication question generation, or the like.

In some examples, one or more automated response actions may be triggered based on, for instance, at least a threshold number of incorrectly answered dynamically generated authentication questions. For instance, if a user fails to correctly answer at least a threshold number of authentication questions, the system may automatically transmit a notification to a pre-registered user device, may modify functionality of one or more devices, may alert a merchant or financial institution, or the like. In some examples, a user account may be flagged and the flag removed upon successfully answering a predetermined number of dynamically generated authentication questions, or the like.

Accordingly, aspects described herein provide secure authentication based on customized questions based in recent user data. The system enables authentication with or without a physical device by using questions that are a function of time (e.g., questions directed to data points occurring at a particular time, or the like) to provide questions with ever-changing answers that may reduce or eliminate the likelihood of unauthorized activity.

Figure 6:
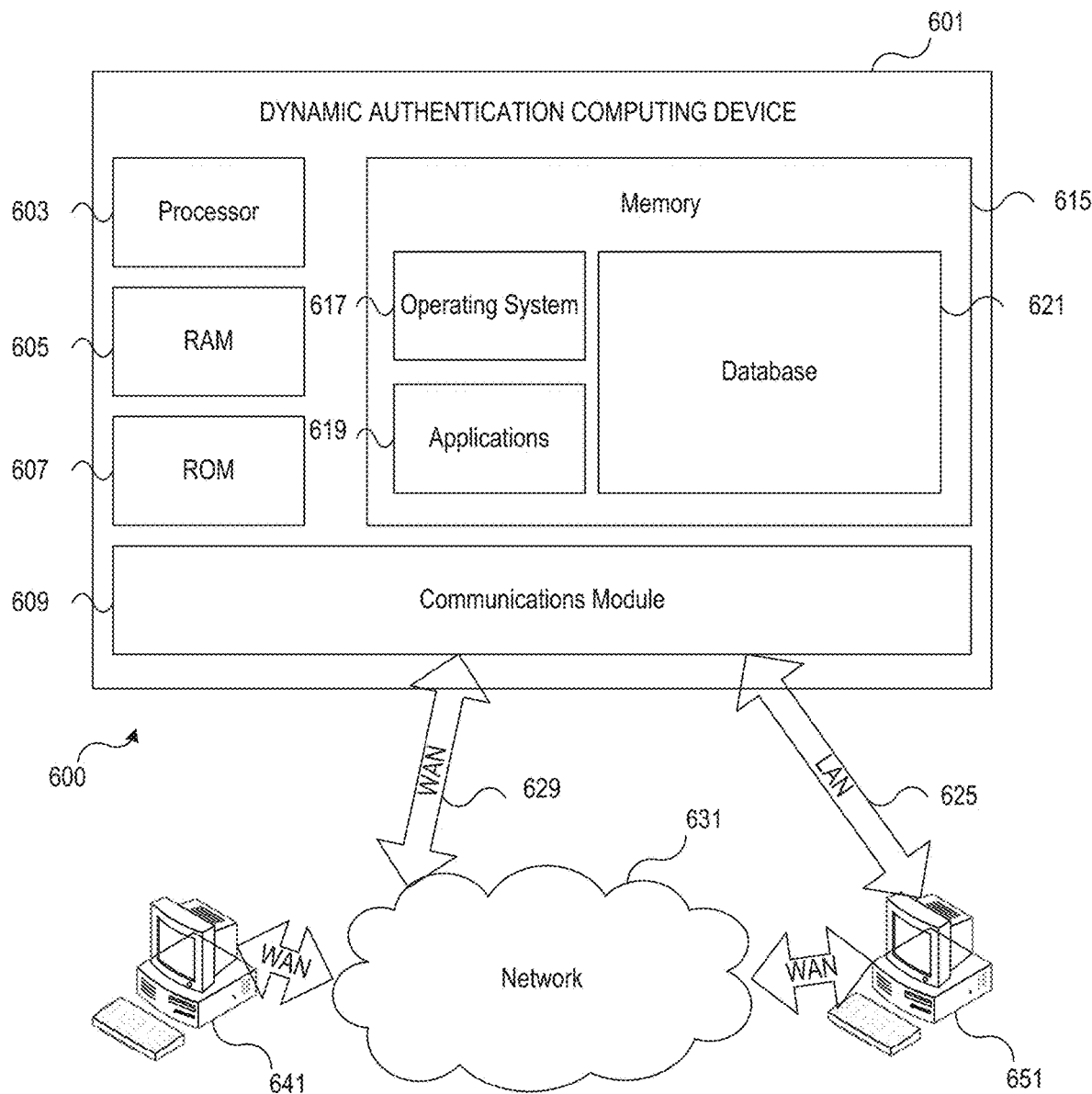
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include dynamic authentication computing device 601 having processor 603 for controlling overall operation of dynamic authentication computing device 601 and its associated components, including Random Access Memory (RAM) 605, Read-Only Memory (ROM) 607, communications module 609, and memory 615. Dynamic authentication computing device 601 may include a variety of computer readable media. Computer readable media may be any available media that may be accessed by dynamic authentication computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by dynamic authentication computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic authentication computing device 601. Such a processor may execute computer-executable instructions stored on a computer-readable medium.

Software may be stored within memory 615 and/or storage to provide instructions to processor 603 for enabling dynamic authentication computing device 601 to perform various functions as discussed herein. For example, memory 615 may store software used by dynamic authentication computing device 601, such as operating system 617, application programs 619, and associated database 621. Also, some or all of the computer executable instructions for dynamic authentication computing device 601 may be embodied in hardware or firmware. Although not shown, RAM 605 may include one or more applications representing the application data stored in RAM 605 while dynamic authentication computing device 601 is on and corresponding software applications (e.g., software tasks) are running on dynamic authentication computing device 601.

Communications module 609 may include a microphone, keypad, touch screen, and/or stylus through which a user of dynamic authentication computing device 601 may provide input, and may also include one or more of a speaker for providing audio output and a video display device for providing textual, audiovisual and/or graphical output. Computing system environment 600 may also include optical scanners (not shown).

Dynamic authentication computing device 601 may operate in a networked environment supporting connections to one or more remote computing devices, such as computing devices 641 and 651. Computing devices 641 and 651 may be personal computing devices or servers that include any or all of the elements described above relative to dynamic authentication computing device 601.

The network connections depicted in FIG. 6 may include Local Area Network (LAN) 625 and Wide Area Network (WAN) 629, as well as other networks. When used in a LAN networking environment, dynamic authentication computing device 601 may be connected to LAN 625 through a network interface or adapter in communications module 609. When used in a WAN networking environment, dynamic authentication computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   receive, from a merchant point-of-sale system, a request to process a transaction, wherein the request to process the transaction is based on detection, by the merchant point-of-sale system, of a wearable device of a user within a predetermined distance of the merchant point-of-sale system;
   responsive to receiving the request to process the transaction, establish a connection with one or more user devices, wherein the one or more user devices include the wearable device of the user;
   receive, in real-time, data from the one or more user devices via the connection established with the one or more user devices, wherein the data includes movement data of the user captured by the wearable device of the user within a previous twenty four hour period and wherein receiving the data causes the computing platform to overwrite data previously received from the one or more user devices;
   analyze, in real-time, the data from the one or more user devices to identify at least one user data point, wherein analyzing the data includes categorizing the data as movement data and identifying the at least one user data point to provide a basis for authentication questions, wherein the at least one user data point includes one of: a duration or distance associated with the movement data captured by the wearable device;
   dynamically generate, in real-time, at least one authentication question based on the identified at least one user data point, wherein the at least one user data point constitutes a correct response to the at least one authentication question;
   transmit the dynamically generated at least one authentication question to the merchant point-of-sale system, wherein transmitting the dynamically generated at least one authentication question to the merchant point-of-sale system causes merchant point-of-sale system to display the at least one authentication question;
   responsive to receiving, from the merchant point-of-sale system, user response data responsive to the dynamically generated at least one authentication question within a predetermined time period:
     compare the user response data to the at least one user data point;
     responsive to determining that the user response data matches the at least one user data point, authenticate the user and authorizing processing of the transaction;
     responsive to determining that the user response data does not match the at least one user data point, generate a request for additional authentication data; and responsive to not receiving user response data responsive to the dynamically generated at least one authentication question within the predetermined time period, delete the identified at least one user data point on which the dynamically generated at least one authentication question is based.

2. The computing platform of claim 1, wherein the at least one user data point includes a range and wherein the user response data matches the at least one data point when the user response data is within the range.

3. The computing platform of claim 1, wherein the dynamically generated at least one authentication question expires if a response is not received in a predetermined time.

4. The computing platform of claim 1, wherein the data from the one or more user devices further includes at least one of: purchase data or location data.

5. The computing platform of claim 1, wherein the request to process the transaction is initiated by a user using one of: a payment device or a user identifier.

6. A method, comprising:
    receiving, by a computing platform having at least one processor and memory and from a merchant point-of-sale system, a request to process a transaction, wherein the request to process the transaction is based on detection, by the merchant point-of-sale system, of a wearable device of a user within a predetermined distance of the merchant point-of-sale system;
    responsive to receiving the request to process the transaction, establishing, by the at least one processor, a connection with one or more user devices, wherein the one or more user devices include the wearable device of the user;
    receiving, by the at least one processor and in real-time, data from the one or more user devices via the connection established with the one or more user devices, wherein the data includes movement data of the user captured by the wearable device of the user within a previous twenty four hour period and wherein receiving the data causes the computing platform to overwrite data previously received from the one or more user devices;
    analyzing, by the at least one processor and in real-time, the data from the one or more user devices to identify at least one user data point, wherein analyzing the data includes categorizing the data as movement data and identifying the at least one user data point to provide a basis for authentication questions, wherein the at least one user data point includes one of: a duration or distance associated with the movement data captured by the wearable device;
    dynamically generating, by the at least one processor and in real-time, at least one authentication question based on the identified at least one user data point, wherein the at least one user data point constitutes a correct response to the at least one authentication question;
    transmitting, by the at least one processor, the dynamically generated at least one authentication question to the merchant point-of-sale system, wherein transmitting the dynamically generated at least one authentication question to the merchant point-of-sale system causes the merchant point-of-sale system to display the at least one authentication question;
    responsive to receiving, by the at least one processor and from the merchant point-of-sale system, user response data responsive to the dynamically generated at least one authentication question within a predetermined time period:
        comparing, by the at least one processor, the user response data to the at least one user data point;
        when it is determined that the user response data matches the at least one user data point, authenticating, by the at least one processor, the user and authorizing processing of the transaction;
        when it is determined that the user response data does not match the at least one user data point, generating, by the at least one processor, a request for additional authentication data; and
    responsive to not receiving user response data responsive to the dynamically generated at least one authentication question within the predetermined time period, deleting, by the least one processor, the identified at least one user data point on which the dynamically generated at least one authentication question is based.

7. The method of claim 6, wherein the at least one user data point includes a range and wherein the user response data matches the at least one data point when the user response data is within the range.

8. The method of claim 6, wherein the dynamically generated at least one authentication question expires if a response is not received in a predetermined time.

9. The method of claim 6, wherein the data from the one or more user devices further includes at least one of: purchase data or location data.

10. The method of claim 6, wherein the request to process the transaction is initiated by a user using one of: a payment device or a user identifier.

11. One or more non-transitory computer-readable media storing instructions that, when executed by a computing platform comprising at least one processor, memory, and a communication interface, cause the computing platform to:
    receive, from a merchant point-of-sale system, a request to process a transaction, wherein the request to process the transaction is based on detection, by the merchant point-of-sale system, of a wearable device of a user within a predetermined distance of the merchant point-of-sale system;
    responsive to receiving the request to process the transaction, establish a connection with one or more user devices, wherein the one or more user devices include the wearable device of the user;
    receive, in real-time, data from the one or more user devices via the connection established with the one or more user devices, wherein the data includes movement data of the user captured by the wearable device of the user within a previous twenty four hour period and wherein receiving the data causes the computing platform to overwrite data previously received from the one or more user devices;
    analyze, in real-time, the data from the one or more user devices to identify at least one user data point, wherein analyzing the data includes categorizing the data as movement data and identifying the at least one user data point to provide a basis for authentication questions, wherein the at least one user data point includes one of: a duration or distance associated with the movement data captured by the wearable device;
    dynamically generate, in real-time, at least one authentication question based on the identified at least one user data point, wherein the at least one user data point constitutes a correct response to the at least one authentication question;
    transmit the dynamically generated at least one authentication question to the merchant point-of-sale system, wherein transmitting the dynamically generated at least one authentication question to the merchant point-of-sale system causes the merchant point-of-sale system to display the at least one authentication question;

responsive to receiving, from the merchant point-of-sale system, user response data responsive to the dynamically generated at least one authentication question within a predetermined time period:

compare the user response data to the at least one user data point;

responsive to determining that the user response data matches the at least one user data point, authenticate the user and authorizing processing of the transaction;

responsive to determining that the user response data does not match the at least one user data point, generate a request for additional authentication data; and responsive to not receiving user response data responsive to the dynamically generated at least one authentication question within the predetermined time period, delete the identified at least one user data point on which the dynamically generated at least one authentication question is based.

12. The one or more non-transitory computer-readable media of claim 11, wherein the at least one user data point includes a range and wherein the user response data matches the at least one data point when the user response data is within the range.

13. The one or more non-transitory computer-readable media of claim 11, wherein the dynamically generated at least one authentication question expires if a response is not received in a predetermined time.

14. The one or more non-transitory computer-readable media of claim 11, wherein the data from the one or more user devices further includes at least one of: purchase data or location data.

15. The one or more non-transitory computer-readable media of claim 11, wherein the request to process the transaction is initiated by a user using one of: a payment device or a user identifier.

* * * * *